United States Patent [19]

James

[11] 3,998,296
[45] Dec. 21, 1976

[54] ANTI-RATTLE SPRING FOR A MOTOR VEHICLE DISC BRAKE

[75] Inventor: Trevor N. James, St. Clair Shores, Mich.

[73] Assignee: Ford Motor Company, Dearborn, Mich.

[22] Filed: Sept. 15, 1975

[21] Appl. No.: 613,769

Related U.S. Application Data

[63] Continuation of Ser. No. 159,381, July 2, 1971, abandoned.

[52] U.S. Cl. .............................. 188/73.5; 188/73.3
[51] Int. Cl.² ...................................... F16D 55/224
[58] Field of Search ............ 188/205 A, 73.4, 73.5, 188/73.3, 72.4, 72.5

[56] References Cited
UNITED STATES PATENTS

| | | | |
|---|---|---|---|
| 3,190,398 | 6/1965 | Evans | 188/73.5 |
| 3,357,523 | 12/1967 | Reed et al. | 188/73.5 |
| 3,403,756 | 10/1968 | Thirion | 188/73.3 |
| 3,616,878 | 11/1971 | Girauldon | 188/73.5 |

FOREIGN PATENTS OR APPLICATIONS

| | | | |
|---|---|---|---|
| 1,555,270 | 12/1968 | France | 188/73.3 |
| 1,952,568 | 5/1971 | Germany | 188/73.5 |

Primary Examiner—George E. A. Halvosa
Attorney, Agent, or Firm—Clifford L. Sadler; Keith L. Zerschling

[57] ABSTRACT

An anti-rattle spring for a motor vehicle disc brake. The brake has an anchor plate secured to a wheel support member. A brake caliper is slidably supported on the anchor and straddles a brake rotor. The caliper is constructed to urge a pair of brake shoes into engagement with the braking surfaces of the rotor. One of the brake shoes is slidably supported on the anchor and the other brake shoe is secured to the caliper. A unique anti-rattle spring is interposed between the one brake shoe and the anchor.

6 Claims, 13 Drawing Figures

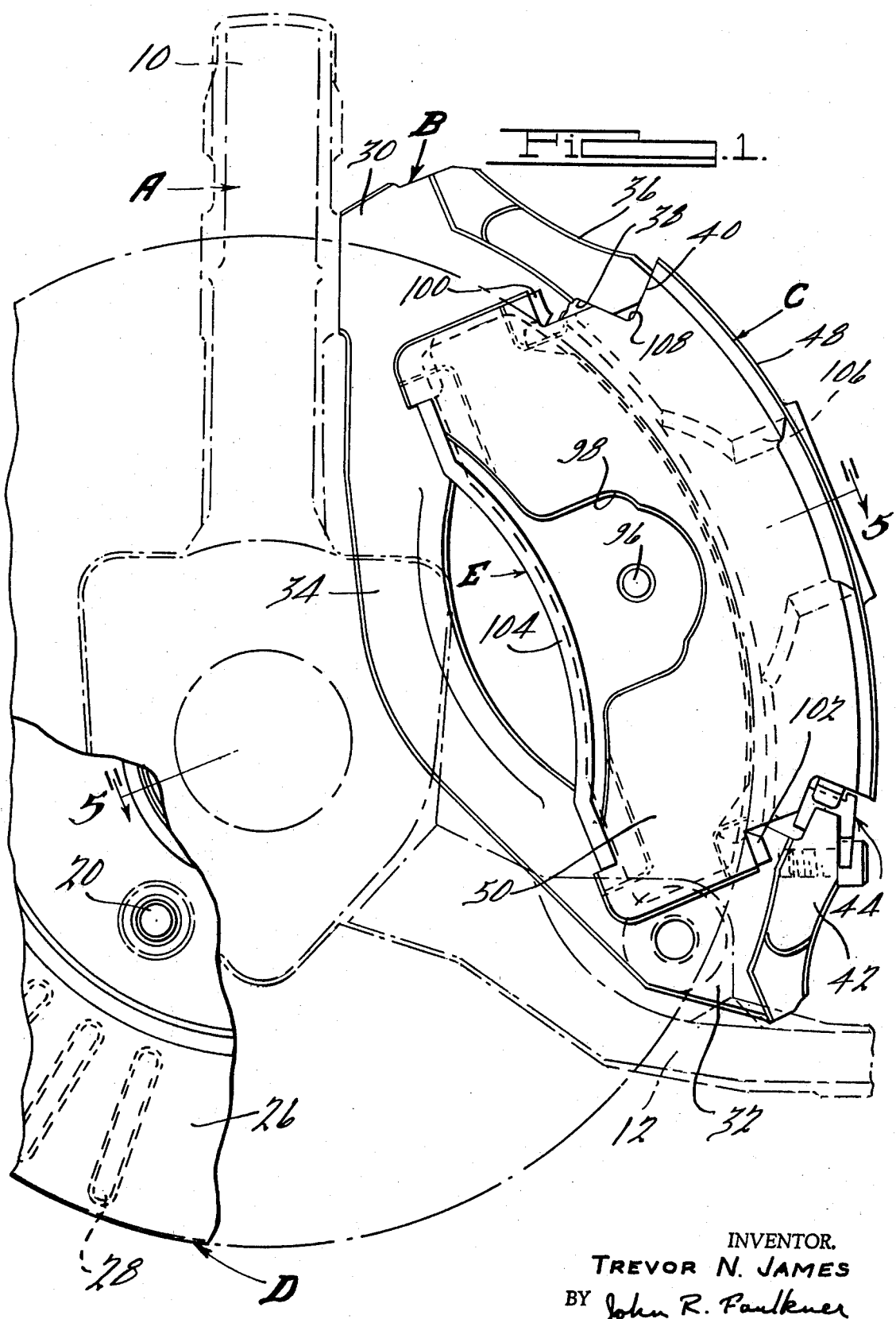

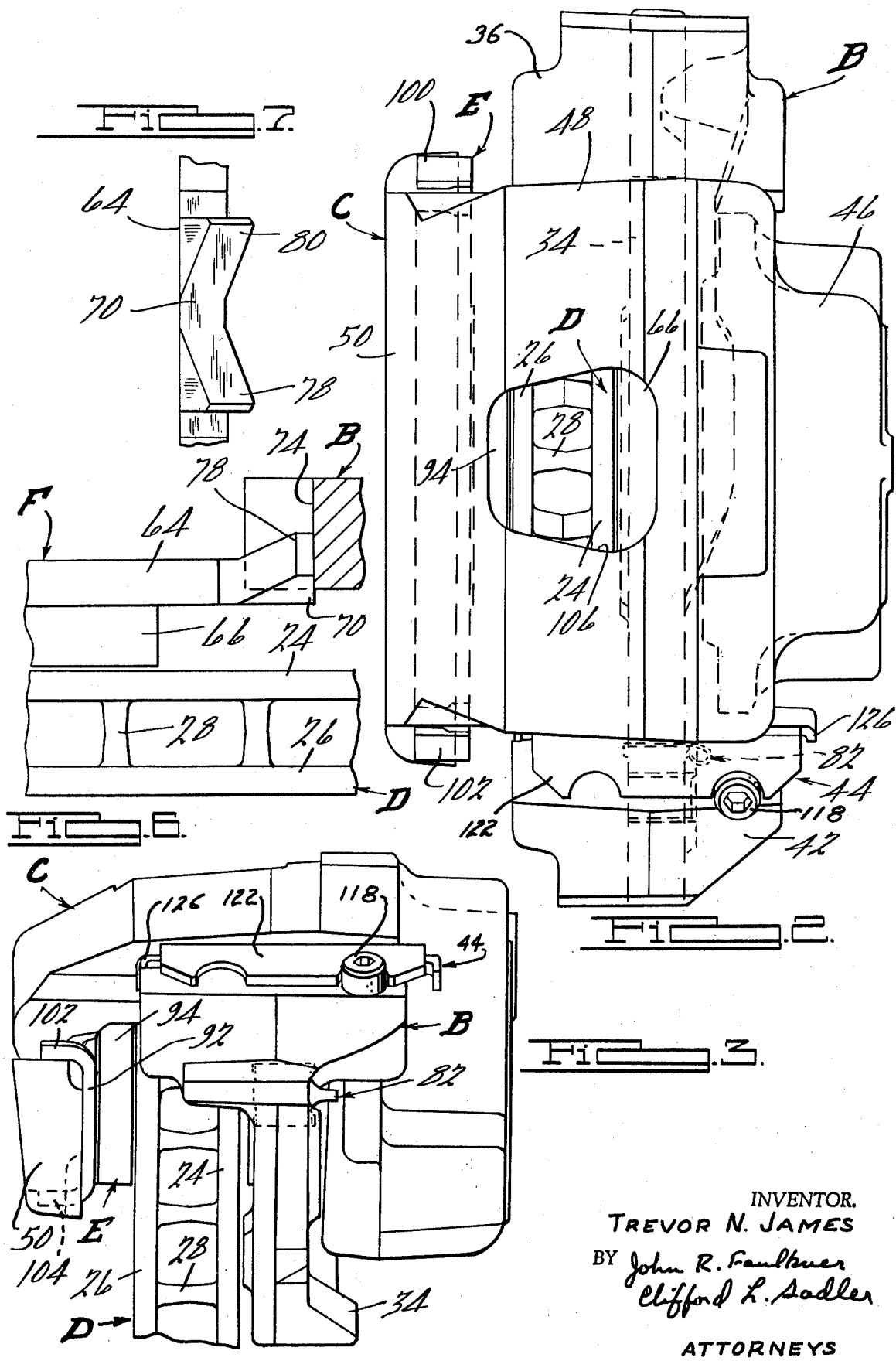

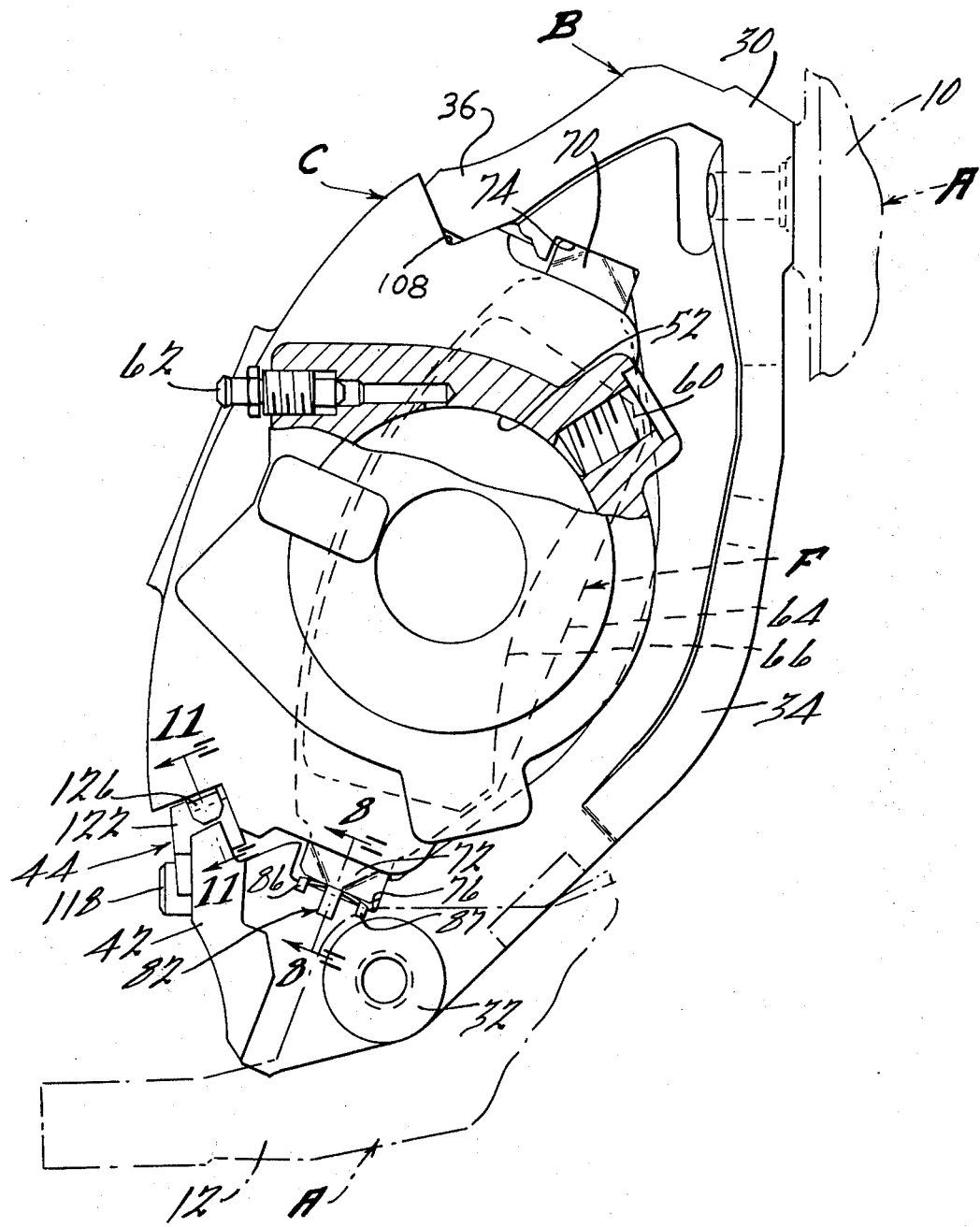

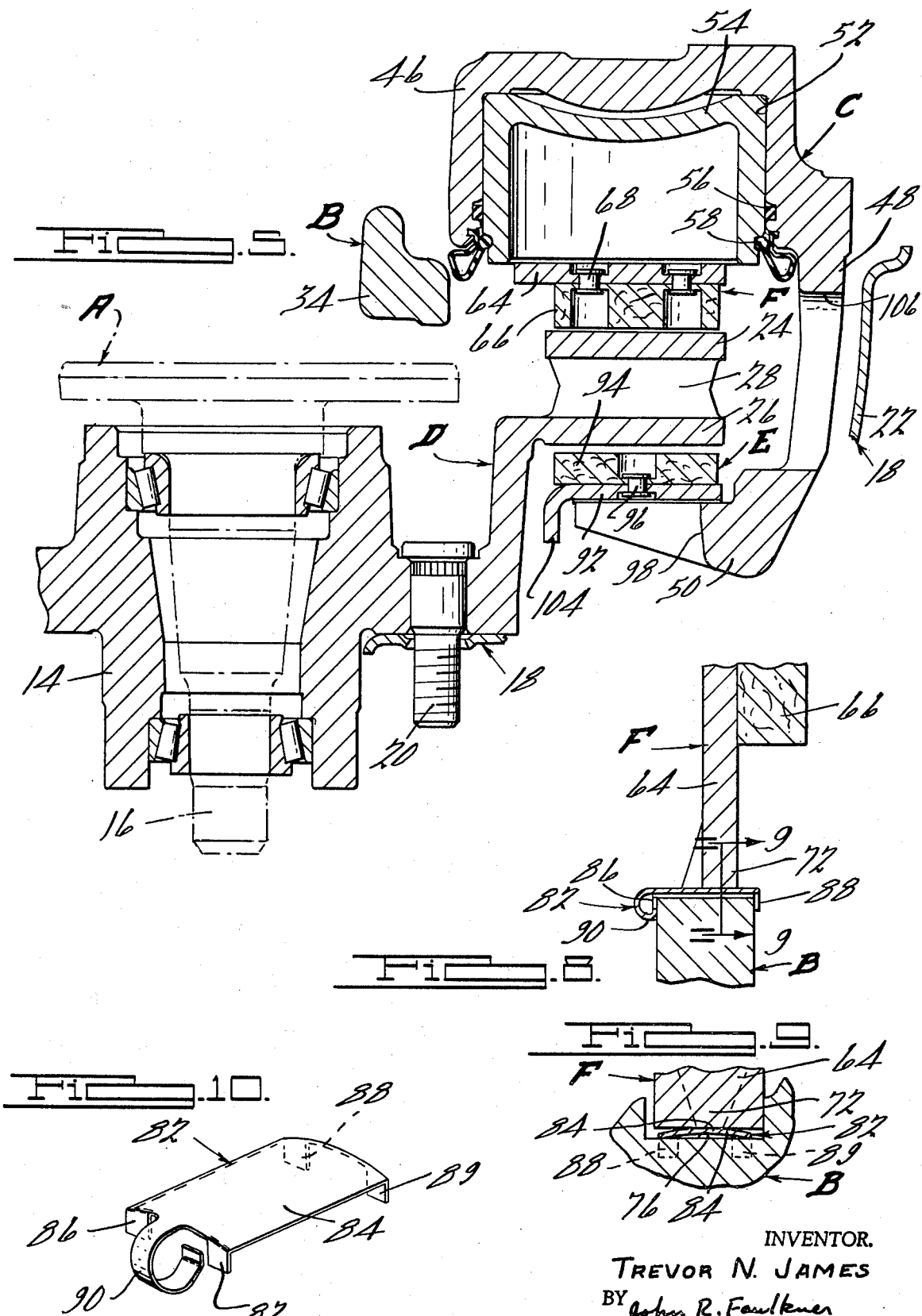

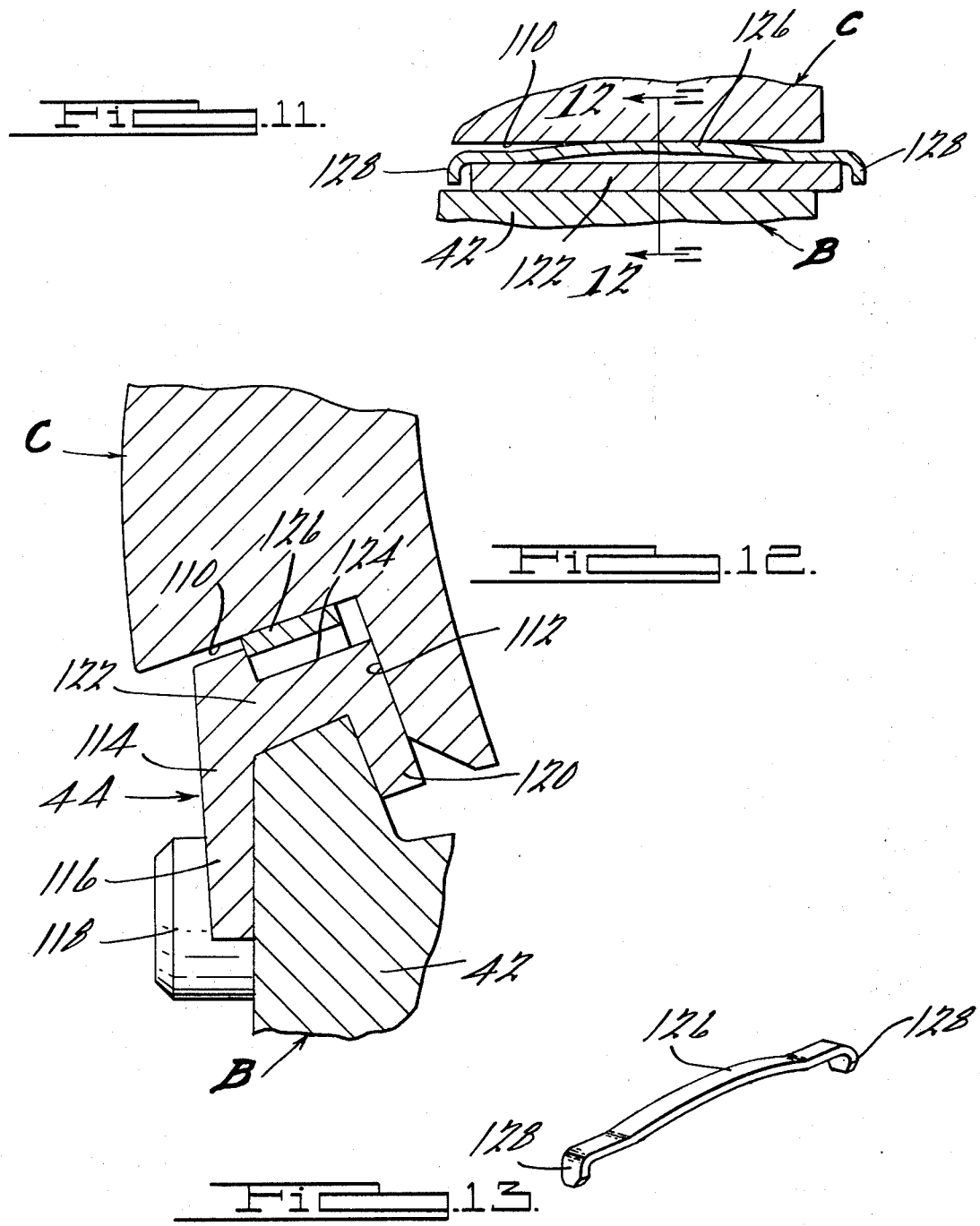

ANTI-RATTLE SPRING FOR A MOTOR VEHICLE DISC BRAKE

BACKGROUND OF THE INVENTION

The present invention relates to disc brakes for motor vehicles. The invention is particularly concerned with the type of disc brake in which at least one of the brake shoes is slidably supported by the anchor plate. In such a construction, any lateral clearance between the one brake shoe and the anchor can be a source of objectionable noise and vibration during normal vehicle operation and during brake application.

It is the principal object of the present invention to provide an anti-rattle means for a disc brake having a brake shoe slidably supported by an anchor plate.

BRIEF SUMMARY OF THE DISCLOSURE

In accordance with one embodiment of this invention, a wheel spindle of a motor vehicle front suspension rigidly supports a disc brake anchor or torque plate and rotatably supports a disc brake rotor. A brake caliper straddles the rotor and is in slidable engagement with the anchor plate. Brake shoes are provided on either side of the rotor which are constructed to be urged by the caliper into frictional engagement with the rotor.

The caliper has a pair of grooves that extend parallel to the rotational axis of the rotor. The anchor plate has a first pair of surfaces that slidably engage the walls of one of the grooves. A releasable retaining means is secured to another portion of the anchor plate and provides a second pair of surfaces that are in slidable engagement with the walls of the other caliper groove. This disc brake construction permits the caliper to slide in a direction parallel to the axis of rotation of the brake rotor during a brake application.

The brake caliper is removable from its connection with the anchor plate by first removing the releasable retaining means. The brake caliper is then free to swing radially outwardly away from engagement with the anchor.

In the preferred embodiment of the present invention, the outboard brake shoe is secured to the caliper. The inboard brake shoe has extending ends that are slidably received in guide grooves formed in the anchor plate. The grooves guide the inboard brake shoe and the lining secured thereto, into engagement with the rotor during a brake application. Clearance must be provided between the shoe ends and the guide grooves in order to accommodate free and uninhibited displacement of the inboard shoe. Such clearance, however, may permit the shoe to rattle, vibrate and chatter. In accordance with the present invention, an anti-rattle spring having an arcuate body portion is situated at the end of one of the guide grooves and occupies the clearance space between the groove and the shoe end. The unique anti-rattle spring exerts a light spring pressure on the inboard brake shoe which prevents it from rattling and, generally, being a source of objectionable noise and vibration.

The body portion of the spring is deflectable and capable of carrying braking torque from the shoe end to the anchor during a brake application.

BRIEF DESCRIPTION OF THE DRAWINGS

The many objects and advantages of a disc brake constructed in accordance with the present invention will become apparent upon consideration of the following detailed description and the accompanying drawings, in which:

FIG. 1 is a side elevational view of a disc brake assembly embodying a presently preferred form of this invention;

FIG. 2 is a rear elevational view of the disc brake assembly of FIG. 1;

FIG. 3 is an end view of the disc brake assembly;

FIG. 4 is a side elevational view, partly in section, of the disc brake assembly viewed from the opposite side of FIG. 1;

FIG. 5 is a sectional view taken along section line 5—5 of FIG. 1;

FIG. 6 is a plan view (slightly enlarged) showing the inboard brake shoe and lining assembly, brake rotor and the anchor plate of the disc brake assembly;

FIG. 7 is an end view (slightly enlarged) of the inboard brake shoe shown in FIG. 6;

FIG. 8 is a sectional view taken along section lines 8—8 of FIG. 4 showing an anti-rattle spring in position between one end of the inboard brake shoe and lining assembly and the anchor plate;

FIG. 9 is a sectional view taken along section lines 9—9 of FIG. 8;

FIG. 10 is a perspective view of the anti-rattle spring of FIGS. 8 and 9;

FIG. 11 is a sectional view taken along section lines 11—11 in FIG. 4 and showing the retaining key and leaf spring;

FIG. 12 is a sectional view taken along section lines 12—12 of FIG. 11; and

FIG. 13 is a perspective view of the leaf spring of FIGS. 11 and 12.

DETAILED DESCRIPTION OF THE PREFERRED EMBODIMENT

Referring now to the drawings for a detailed description of the presently preferred embodiment of this invention, FIG. 1 illustrates a disc brake assembly for the front wheel of a motor vehicle.

In FIG. 1, the assembly includes a wheel spindle A to which an anchor or torque plate B is rigidly secured. A floating brake caliper C is slidably supported on the anchor B. The caliper C straddles a brake rotor D that is rotatably supported on the spindle A. The brake assembly includes an outboard brake shoe and lining assembly E which is supported on the caliper C and an inboard brake shoe and lining assembly F which is supported on the anchor B. A hydraulic motor within the caliper C is constructed to draw the brake shoe and assemblies E and F together and clamp the brake rotor D therebetween. When the rotor D is clamped, braking torque is transmitted from the outboard shoe and lining assembly E through the caliper C to the anchor B. Braking torque exerted on the inboard shoe and lining assembly F is transmitted directly to the anchor B.

The wheel spindle A forms a part of an independent front suspension system for a motor vehicle and is constructed to be connected to upper and lower suspension arms. The spindle A includes an upwardly extending arm 10 which is designed to receive a ball joint assembly for connection with the upper suspension arm. the lower suspension arm connects to the spindle A at a point not shown in the drawings. The spindle A also includes a rearwardly extending steering arm 12 that is constructed to be connected to the steering linkage of the motor vehicle. The spindle A still further comprises a spindle shaft 16.

Referring to FIG. 5, the brake rotor D has a generally hat-shaped construction with a hub portion 14 that is rotatably supported on the shaft portion 16 of the spindle A by means of spaced roller bearings. A road wheel 18 is secured to the hub of the rotor D by means of circumferentially spaced bolts 20. The wheel 18 includes a rim portion 22 which is designed to support a pneumatic tire.

The rotor D includes inboard and outboard annular braking surfaces 24 and 26. The members which form the braking surfaces 24, 26 are separated by fins 28. The fins 28 are circumferentially spaced apart so as to provide radial passages between the braking surfaces 24, 26 for the flow of cooling air. Due to the spacing of the braking surfaces 24, 26 and the passages formed by the fins 28, the rotor D is of the type which is sometimes referred to as a ventilated rotor.

The anchor or torque plate B includes a first portion 30 that is bolted to the upright arm 10 and a second portion 32 that is bolted to the steering arm 12 of the spindle A. A bridging member 34 extends between the first and second anchor plate attaching portions 30 and 32. The anchor plate B includes a guide member 36 having a pair of guide surfaces 38 and 40. The guide surfaces 38, 40 are situated radially outwardly beyond the periphery of the rotor D and extend axially across its periphery. The surface 38, 40 support a portion of the caliper C. The anchor B also includes a guide support 42 situated adjacent to the anchor attaching portion 32. The guide support 42 is situated radially outwardly of the rotor D and extends axially across its periphery. Guide support 42 supports a releasable retaining means 44 that engages the caliper C as will be described in greater detail later.

The brake caliper assembly C straddles the rotor D and is in slidable engagement with the anchor B. Referring to FIG. 5, the caliper C includes a casting having a hydraulic cylinder portion 46, a bridging portion 48 that spans the periphery of the rotor D and a reaction portion 50 situated adjacent the outboard braking surface 26 of rotor D.

The hydraulic cylinder portion 46 of the caliper C includes a cylinder bore 52 in which a piston 54 is slidably received. An annular seal 56 seals the clearance between the cylinder bore 52 and the piston 54. A flexible boot seal 58 is interposed between the cylinder body 46 and the piston 54 to protect the cylinder bore 52 from contamination.

As seen in FIG. 4, a port 60 passes through the body of the cylinder portion 46 and connects with the interior of the cylinder bore 52. Port 60 provides a means for connecting a hydraulic pressure source (such as a brake master cylinder) to the chamber situated between the end of the piston 54 and the end of the cylinder bore 52. Fitting 62 provides a means for bleeding air from the hydraulic chamber in a well-known manner for a well-known purpose.

The inboard brake shoe and lining assembly F includes a rigid metal brake shoe 64 to which a frictional brake lining 66 is secured by means of rivets 68. The brake lining 66 is generally smaller than the brake shoe 64. The inboard brake shoe 64 has extending end portions 70 and 72 that fit within generally rectangular guide grooves 74 and 76 provided in the anchor plate B. The rectangular grooves 74, 76 provide guide means for the displacement of the inboard brake shoe and lining assembly F in an axial direction toward the braking surface 24 of rotor D.

The inboard brake shoe and lining assembly F is interposed between the piston 54 and braking surface 24 of the rotor D with the piston arranged to engage the backside of the shoe 64. The lining 66 has a friction face that is constructed to engage the friction surface 24 of the rotor D.

As seen in FIGS. 6 and 7, the corners 78 and 80 of the end 70 of the inboard shoe 64 are each bent along a diagonal in a direction away from the lining 66 and away from the braking surface 24 of rotor D. In the end view (FIG. 7), the end surface of the shoe 64 has a V-shaped configuration. The V-shape produced by angling of the corners 78 and 80 provides an increased effective thickness to the bearing surface of the shoe end 70 which engages the depth of the groove 74 of anchor B.

An anti-rattle spring 82 is interposed betweeen the other end 72 of the inboard brake shoe 74 and the depth of the guide groove 76 in the anchor B. The location of the anti-rattle spring 82 is shown in FIG. 4 and its construction is illustrated in greater detail in FIGS. 8, 9 and 10. The anti-rattle spring 82 has an arcuate body portion 84 with a generally rectangular shape in plan view. Tabs 86, 87, 88 and 89 are arranged generally perpendicular to the main body 84 of the spring 82 with one at each corner. The spring 82 is fitted into the groove 76 with the tabs 86, 87 situated on one side of the anchor plate B and the tabs 88, 89 positioned on the other side of the anchor plate B.

A circular spring element 90 is integrally formed of the spring 82 and has a curled over end that engages the anchor plate B adjacent the groove 76. The circular portion 90 exerts a spring force that draws the tabs 88, 89 into tight engagement with the anchor B.

The end 72 of the inboard brake shoe 64 has its corners bent along diagonal lines in the same fashion as the end 70 shown in FIGS. 6 and 7. The end 72 has an end surface of V-shaped configuration similar to that shown in FIG. 7 which bears against the body portion 84 of spring 82.

The arcuate body portion 84 of the anti-rattle spring 82 occupies the clearance space between the torque transmitting end 72 of the inboard brake shoe and lining assembly F and the depth of the groove 76. The spring 82 is constructed to accommodate any variation due to manufacturing tolerances in the dimension between the depths of the grooves 74 and 76 and the length of the inboard brake shoe 64 from end 70 to end 72. The anti-rattle spring 82 maintains a bias force on the brake shoe and lining assembly F and prevents it from chattering or rattling either when the disc brake is being applied or when the brake shoe assembly F is desengaged from the rotor D.

The outboard brake shoe and lining assembly E is secured to the reaction portion 50 of caliper C and comprises a stamped metal shoe 92 to which a brake lining 94 is affixed by means of a series of rivets 96.

The reaction portion 50 of the caliper C is bifurcated by a central recess 98. The outboard brake shoe 92 has edge portions that are turned or bent to form flanges which grip the bifurcated parts of the caliper reaction portion 50. The gripping flanges include bent over tabs 100 and 102 (FIGS. 1, 2 and 3) situated at the corners of the shoes 92. The lower edge of the outboard brake shoe 92 is provided with an extended flange 104. The ends of the flange 104 engage the bifurcated parts of the reaction portion 50 whereby the parts are trapped between the ends of flange 104 and the tabs 100 and 102. This flange arrangement secures the outboard brake shoe and lining assembly E to the caliper C.

The bridging portion 48 of the caliper C which spans the periphery of the rotor D and interconnects the cylinder portion 46 and reaction portions 50 is provided with a central opening 106. The opening 106 serves as a means for permitting the visual inspection of the linings 66 and 94 of the inboard and outboard brake shoe and lining assemblies F and E.

Means are provided in accordance with the present invention for slidably supporting and releasably securing the caliper C to the anchor plate B. One edge of the bridging portion 48 of caliper C is provided with a V-shaped axially extending groove 108. The angle surfaces which form the V-shaped groove 108 complement the inclined surfaces 38 and 40 of the guide member 36 of anchor plate B. In operation, the inclined surfaces of the V-shaped caliper groove 108 are in slidable engagement with inclined surfaces 38 and 40.

Similarly, angled surfaces 110 and 112 define a V-shaped groove at the opposite edge of the bridging portion of caliper C. The releasable retaining means 44 is interposed between the guide support 42 and the V-shaped groove formed by the angle surfaces 110, 112. The releasable retaining means 44 provides slidable supports for the caliper C and, in addition, a means for removing the caliper from engagement with the anchor B.

The releasable retaining means 44 includes a key 114 having a generally channel-shaped construction that extends axially across the periphery of the rotor D and is supported by the guide support 42 of the anchor plate B. The key 114 includes an outer flange 116 which rests against the exterior surface of the guide support 42 and is provided with at least one notch on the edge of the flange 116. A machine screw 118 is secured in a threaded hole in the guide support 42 and engages one of the notches in the key flange 116. This interrelationship prevents the axial displacement of the key.

The key 114 includes a second flange 120 positioned adjacent the lower surface of the guide support 42. The lower flange 120, in addition to being positioned adjacent the guide support 42, has its exterior surface in slidable engagement with the surface 112 of the caliper groove. The central portion 122 of the key 114 is formed with an axially extending groove 124 in which a leaf spring 126 is positioned. The spring 126 has a central bowed portion that engages the surface 110 of the caliper groove and flat axially extending end portions which engage the groove 120 of the key 114. The ends 128 of the spring 126 are bent at an angle to form locating tabs.

The channel-shaped key 122 is located with respect to the guide support 42 by the machine screw 118. The leaf spring 126 is secured and located in position by the bent ends 128 which prevents its axial displacement. As indicated in FIG. 11, the leaf spring 126 is of sufficient length so as to span the key 122 with its bent ends 128 positioned adjacent the ends of the key 122. The leaf spring 126 is constructed to exert a spring force tending to move the caliper C in a direction away from guide support 42 and into engagement with the inclined surfaces 38, 40 of the guide member 36 of anchor B.

OPERATIONS

The disc brake assembly is shown in the drawings in association with the left front wheel of an automobile. The brake rotor D rotates in a counterclockwise direction as seen in FIG. 1 during forward movement of the vehicle. During a brake application, pressure fluid is admitted through the port 60 into the chamber between the piston 54 and the depth of the bore 52. Pressure fluid in this chamber causes the piston 54 to move toward the brake rotor D (see FIG. 5). This action forces the inboard brake shoe and lining assembly F to move into engagement with the annular friction surface 24 of the rotor D. The inboard brake shoe and lining assembly F is guided in it movement toward the rotor D by its ends 70 and 72 which slide in the anchor plate grooves 74 and 76.

The bridge portion 48 of caliper C is in slidable engagement with the guide member 36 of anchor B and the releasable retaining means 44 connected to guide support 42. When the pressure chamber of cylinder 52 is pressurized with hydraulic fluid, the piston 54 and inboard brake shoe and lining assembly F move toward the rotor 20. The body of caliper C is drawn in the opposite direction by the pressurization of the chamber. This causes the reaction portion 50 to draw the outboard brake shoe and lining assembly F into engagement with the annular friction face 26 of rotor D. Thus, when the chamber of cylinder bore 52 is pressurized with hydraulic fluid, the caliper C is activated to cause the inboard and outboard brake shoe and lining assemblies F and E to trap the rotor D.

When the linings 66 and 94 engage the rotor D, they will tend to shift laterally in the direction of rotor rotation. Rotation of the inboard brake shoe and lining assembly F will be resisted and prevented by the engagement of the leading end 70 of the shoe 64 with the depth of the groove 74 in anchor B. The outboard brake shoe and lining assembly F is secured to the caliper casting C so that when it is drawn into engagement with the rotor D, braking torque will be transmitted through the caliper C to the guide member 36.

When the vehicle having the disc brake of FIG. 1 is moving in reverse, the rotor D will be turning in a clockwise direction. A brake application under these circumstances will cause the inboard brake shoe linings assembly F to transmit braking torque through the normally trailing end 72 through the anti-rattle spring 82 to the anchor plate groove 76 (FIGS. 8 and 9). Braking torque for the outboard shoe and lining assembly E will be transmitted through the caliper C and the releasable retaining means 44 to the guide support 42.

It will be noted from FIGS. 6 and 7 that the corners 78 and 80 of the leading end 70 of inboard brake shoe 64 are angularly bent whereby the effective thickness of the shoe 64 is increased. This unique construction acts to stabilize the support for the brake shoe 64. In addition, it increases the effective thickness of the brake shoe so that when the lining 66 becomes worn, the corner portions of the end face of the leading end 70 will remain in engagement with the depth of the groove 74 (see FIG. 6). The trailing end 72 (see FIGS. 8 and 9) is similarly constructed with bent corners which provide a V-shaped end face in engagement with the anti-rattle spring 82.

The condition of the linings 66 and 94 can be determine by visual observation through the hole 106 in the bridge portion 48 of caliper C. If it is determined that the linings are worn and need to be replaced, the caliper C may be removed from engagement with the anchor B by removal of the releasable retaining means 44. This is done by withdrawing the threaded machine screw 18 which permits the key 122 and leaf spring 126 to be displaced in an axial direction until these two elements are removed from engagement with the caliper C and anchor B. A gap then exists between the guide support 42 and the inclined surfaces 110, 112. To remove the caliper C, it is merely necessary to swing it in pivotal fashion about the contact between the groove 108 and the inclined surfaces 38 and 40. The channel-shaped key 114 is designed to have a base portion 122 of sufficient thickness so that when it is removed, a big enough gap will be provided to permit the dge of surface 112 (FIG. 12) to clear the end of the guide support 42 as it is swung radially outwardly.

Once the caliper c is removed from engagement with the anchor B, the outboard brake shoe and lining assembly F may be forcibly removed from the reaction portion 50 of the caliper C for replacement purposes. With the caliper C out of the way, the inboard brake shoe and lining assembly F may be removed in an axial direction from its connection with the grooves 74, 76 of anchor B for replacement purposes.

In accordance with a slightly alternate procedure for disassembling the brake, the key 114 and leaf spring 126 are first removed. The caliper C is then shifted circumferentially to close the gap left by the removed key 114 and spring 126 whereby the caliper guide support 42 is placed in nested engagement with the V-shaped groove formed by inclined surfaces 110 and 112. The caliper C is then free to pivot about its engagement with guide support 42 in an outward direction. The edges of the groove 108 will clear the guide member 36 of anchor B.

It is to be noted that the minimum distance between the guide member 36 and guide support 42 is less than the maximum width of the bridging portion 48 of caliper C so that the guide member 36 must be nested in the groove 108 or the guide support 42 nested in the groove of surfaces 110, 112 in order to permit the radial removal of the caliper C after the key 114 and spring 126 are removed.

SUMMARY

In accordance with the presently preferred embodiment of this invention, a unique disc brake assembly is provided having an anti-rattle spring that occupies the clearance space between the brake shoe end and the guide grooves in the anchor. The spring exerts a light force upon the brake shoe which prevents it from rattling and vibrating. The smooth configuration of the arcuate body portion of the spring is such as to not inhibit the free displacement of the brake shoe toward the brake rotor during a brake application. In addition, braking torque may be transmitted through the anti-rattle spring during a brake application when the vehicle is moving rearwardly without damage to the spring.

The foregoing description presents the preferred embodiment of this invention. Modifications and alterations may occur to those skilled in the art which will come within the scope and spirit of the following claims.

I claim:

1. In a disc brake having a rotor including a pair of opposed friction faces, a torque member disposed adjacent said rotor and having a pair of opposed inner edges, a friction element slidably mounted on said torque member and having portions adjacent each of said inner edges, and actuating means for urging said friction element into engagement with one of said friction faces, anti-rattle means comprising:

a resilient body portion disposed between one of said inner edges and a corresponding portion of said friction element, the resiliencey of said body portion yieldably urging said friction element toward the other inner edge;

retaining means extending from one edge of said body portion and engaging said torque member;

resilient means yieldably maintaining said retaining means in engagement with said torque member to lock said anti-rattle means in place;

said retaining means including lug means extending from said one edge of said body portion to engage one side of said torque member;

said resilient means extending from another edge of said body portion and engaging the other side of said torque member, whereby said resilient means yieldably maintains said lug means in engagement with said one side of said torque member; and lug means extending from said another edge of said body portion and adapted to engage said other side of said torque member.

2. In a disc brake having a rotor including a pair of opposed friction faces, a torque member disposed adjacent said rotor and having a pair of opposed inner edges, a friction element slidably mounted on said torque member and having portions adjacent each of said inner edges, and actuating means for urging said friction element into engagement with one of said friction faces, anti-rattle means comprising:

a resilient body portion disposed between one of said inner edges and a corresponding portion of said friction element, the resiliency of said body portion yieldably urging said friction element toward the other inner edge;

retaining means extending from one edge of said body portion and engaging said torque member;

resilient means yieldably maintaining said retaining means in engagement with said torque member to lock said anti-rattle means in place;

said retaining means including lug means extending from said one edge of said body portion to engage one side of said torque member;

said resilient means extending from another edge of said body portion and engaging the other side of said torque member, whereby said resilient means yieldably maintains said lug means in engagement with said one side of said torque member;

said resilient means being a loop integral with said body portion, said loop engaging said other side of the torque member, said loop deforming as said body portion is moved away from said other side of said torque member whereby the resiliency of said loop yieldably urges said body portion toward said other side of the torque member to thereby yieldably maintain said lug means in engagement with said one side of said torque member;

and lug means extending from said other edge of said body portion and adapted to engage said other side of said torque member.

3. In a disc brake:

a rotor having a pair of opposed friction faces;

a torque member mounted adjacent one of said friction faces having a pair of circumferentially spaced arms defining a recess therebetween;

a friction member slidably mounted in said recess and adapted to engage one of said friction faces;

one of said members having notches provided therein, the other member having projections extending therefrom slidably received within said notches;

actuating means for urging said friction element into frictional engagement with said one friction face;

anti-rattle means including a resilient body portion disposed between the edge of one of said notches and a corresponding projection, retaining means extending from one edge of said body portion and engaging said torque member, and resilient means yieldably urging said body portion transversely of said one notch whereby said retaining means are yieldably maintained in engagement with said torque member to lock said anti-rattle means in place;

said retaining means including lugs extending from one edge of said body portion to engage one side of said torque member;

said resilient means extending from another edge of said body portion and engaging the other side of said torque member, whereby said resilient means yieldably maintains said lug means in engagement with said one side of said torque member; and lug means extending from said another edge of said body portion and adapted to engage said other side of said torque member.

4. The invention in claim 3;

said resilient means being a loop integral with said body portion, said loop having a side engaging said other side of said torque member, said loop deforming as said body portion is moved away from said other side of said torque member whereby the resiliency of said loop yieldably urges said body portion toward said other side of the torque member to therby yieldably maintain said lug means in engagement with said one side of said torque member.

5. A disc brake for a motor vehicle having a stationary anchor;

a rotatable rotor;

first and second brake shoe and lining assemblies disposed adjacent said rotor;

hydraulic actuator means supported on said anchor and constructed to move both of said assemblies into frictional engagement with said rotor;

said anchor having first and second axially extending guide grooves;

said groove having generally rectangular cross sectional configurations;

said first brake shoe and lining assembly having a generally segmentally shaped brake lining;

said first assembly having a brake shoe secured to said lining;

said brake shoe having first and second end portions extending beyond the edges of said brake lining;

said first and second end portions being generally rectangular and fitted within said first and second guide grooves;

said first guide groove having a first guide surface;

said first end portion having an end surface in slidable engagement with said first guide surface of said first guide groove;

said second end portion having an end surface;

said second guide groove having a guide surface juxtaposed the said end surface of said second end portion;

a brake load transmitting member disposed in said second guide groove and connected to said anchor;

said brake load transmitting member being in slidable engagement with the said end surface of said second end portion and constructed to transmit a braking load from said second end portion to said anchor;

said brake load transmitting member having a resilient portion constructed to exert a spring force on said first assembly urging said end surface of said first end portion into engagement with said first guide surface;

said brake load transmitting member having an arcuate body portion slidably engaging the said end surface of said second end portion;

integral tabs extending generally perpendicular from said body portion and disposed on either side of said anchor;

a circular spring portion connected to said body portion and engaging said anchor;

said circular spring portion and said tabs being constructed to connect said brake load transmitting member to said anchor.

6. A disc brake for a motor vehicle having a brake torque carrying member:

a brake rotor supported to rotate in either a first or second direction;

first and second brake shoe and lining assemblies disposed adjacent said rotor;

hydraulic actuator means supported on said member and constructed to move both of said assemblies into frictional engagement with said rotor;

said first brake shoe and lining assembly being slidably supported by said member;

said first assembly having a generally segmentally shaped brake lining;

said first assembly having a brake shoe secured to said lining;

said brake shoe having first and second brake torque transferring end portions extending beyond the edges of said brake lining;

said member having first and second axially extending guide surfaces;

said first end portion slidably engaging said first guide surfaces;

an anti-rattle spring interposed between said second end portion and said second surface;

said anti-rattle spring being constructed to exert a spring force urging said first end portion into engagement with said first guide surface;

said disc brake being constructed to transmit a braking load directly from said first end portion to said first guide surface when said assemblies are in engagement with said rotor and said rotor is rotating in said first direction;

said spring being constructed to transmit a braking load from said second end portion to said second guide surface when said assemblies are in engagement with said rotor and said rotor is rotating in said second direction;

said anti-rattle spring having an arcuate body portion slidably engaging said second end portion and connected to said member adjacent said second guide surface;

integral tabs extending generally perpendicularly from said body portion and engaging said member;

said anti-rattle spring having a circular spring portion;

said circular spring portion and said tabs being constructed to connect said anti-rattle spring to said member.

* * * * *